United States Patent [19]

Johnston

[11] Patent Number: 5,791,658
[45] Date of Patent: Aug. 11, 1998

[54] SEAL DESIGN WITH BI-DIRECTIONAL PUMPING

[75] Inventor: David E. Johnston, East Hebron, N.H.

[73] Assignee: Freudenberg-NOK General Partnership, Plymouth, Mich.

[21] Appl. No.: 791,536

[22] Filed: Jan. 31, 1997

Related U.S. Application Data

[63] Continuation of Ser. No. 397,996, Mar. 3, 1995, abandoned.

[51] Int. Cl.⁶ .................................................. F16J 15/32
[52] U.S. Cl. .................................... 277/559; 277/549
[58] Field of Search .................................. 277/134, 152, 277/549, 559

[56] References Cited

U.S. PATENT DOCUMENTS

| | | | |
|---|---|---|---|
| 3,501,155 | 3/1970 | Dega et al. | 277/1 |
| 3,534,969 | 10/1970 | Weinand | 277/1 |
| 3,633,927 | 1/1972 | VanDeven | 277/134 |
| 3,672,690 | 6/1972 | Berers | 277/134 |
| 3,868,105 | 2/1975 | Bentley | 277/134 |
| 3,921,987 | 11/1975 | Johnston et al. | 277/134 |
| 3,929,340 | 12/1975 | Peisker | 277/134 |
| 4,119,324 | 10/1978 | Denton et al. | 277/134 |
| 4,131,285 | 12/1978 | Denton et al. | 277/1 |
| 4,155,560 | 5/1979 | Repella | 277/153 |
| 4,288,083 | 9/1981 | Braconier | 277/134 |
| 4,399,998 | 8/1983 | Otto | 277/134 |
| 4,427,205 | 1/1984 | Holzer et al. | 277/134 |
| 4,501,431 | 2/1985 | Peisker et al. | 277/134 |
| 4,613,143 | 9/1986 | Butler | 277/134 |
| 4,750,747 | 6/1988 | Holzer | 277/134 |
| 4,789,166 | 12/1988 | Rericha et al. | 277/153 |
| 4,815,749 | 3/1989 | Johnston | 277/134 |
| 4,834,397 | 5/1989 | Shimasaki et al. | 277/152 |
| 4,844,485 | 7/1989 | Antonini et al. | 277/153 |
| 4,969,653 | 11/1990 | Breen | 277/134 |
| 4,986,553 | 1/1991 | Preston et al. | 277/152 |
| 5,002,289 | 3/1991 | Yasui et al. | 277/134 |
| 5,139,275 | 8/1992 | Ehrmann et al. | 277/134 |
| 5,143,385 | 9/1992 | Sponagel et al. | 277/134 |
| 5,190,299 | 3/1993 | Johnston | 277/152 |
| 5,209,502 | 5/1993 | Savoia | 277/152 |
| 5,271,629 | 12/1993 | Dahlhaus et al. | 277/23 |
| 5,427,387 | 6/1995 | Johnston | 277/152 |

FOREIGN PATENT DOCUMENTS

| | | |
|---|---|---|
| 1153578 | 3/1964 | Germany. |
| 4200927 | 1/1992 | Germany. |
| 1220985 | 1/1971 | United Kingdom. |

*Primary Examiner*—Daniel G. DePumpo
*Attorney, Agent, or Firm*—Dinnin & Dunn, P.C.

[57] ABSTRACT

A shaft seal of the type utilizing a metal support element or seal case which fits or is inserted into a housing. The seal includes a seal element extending radially inward which when disposed over the shaft causes the seal to flex about a flex section thus applying a contacting force to a seal lip. The seal lip includes a plurality of radial undulations along the seal face, said undulations radial with respect to the axis of the shaft. Said seal lip further including a static seal for engaging the outer circumferential surface of the shaft. The seal element is formed of a semi-rigid material such as a fluorinated resin or thermo-plastic elastomer. Such seals exhibit high-wear characteristics opposed to the low-wear characteristics of an elastomer. Further, the seal element includes a plurality of symmetrical undulations which provide a hydro-dynamic pumping effect to pump any fluid migrating along the shaft/seal interface back into the sealed space.

28 Claims, 4 Drawing Sheets

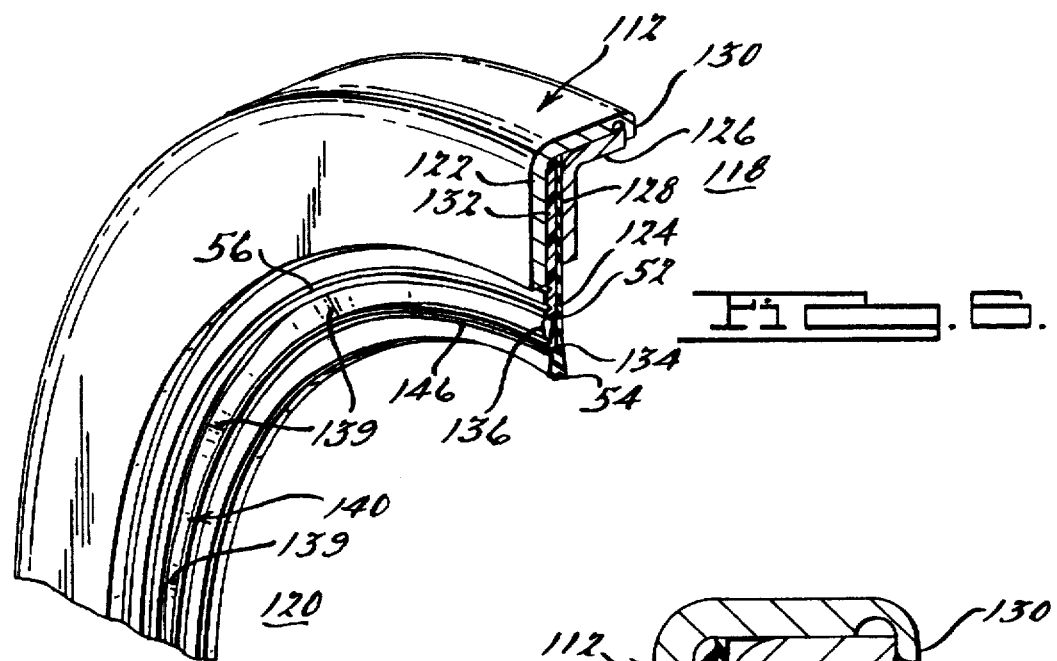
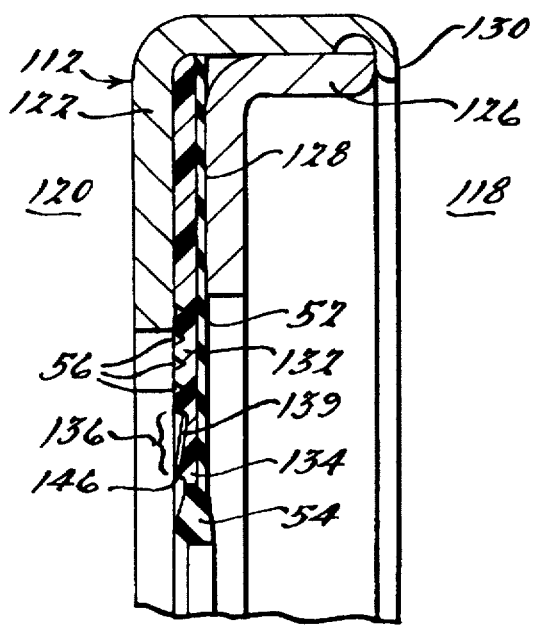
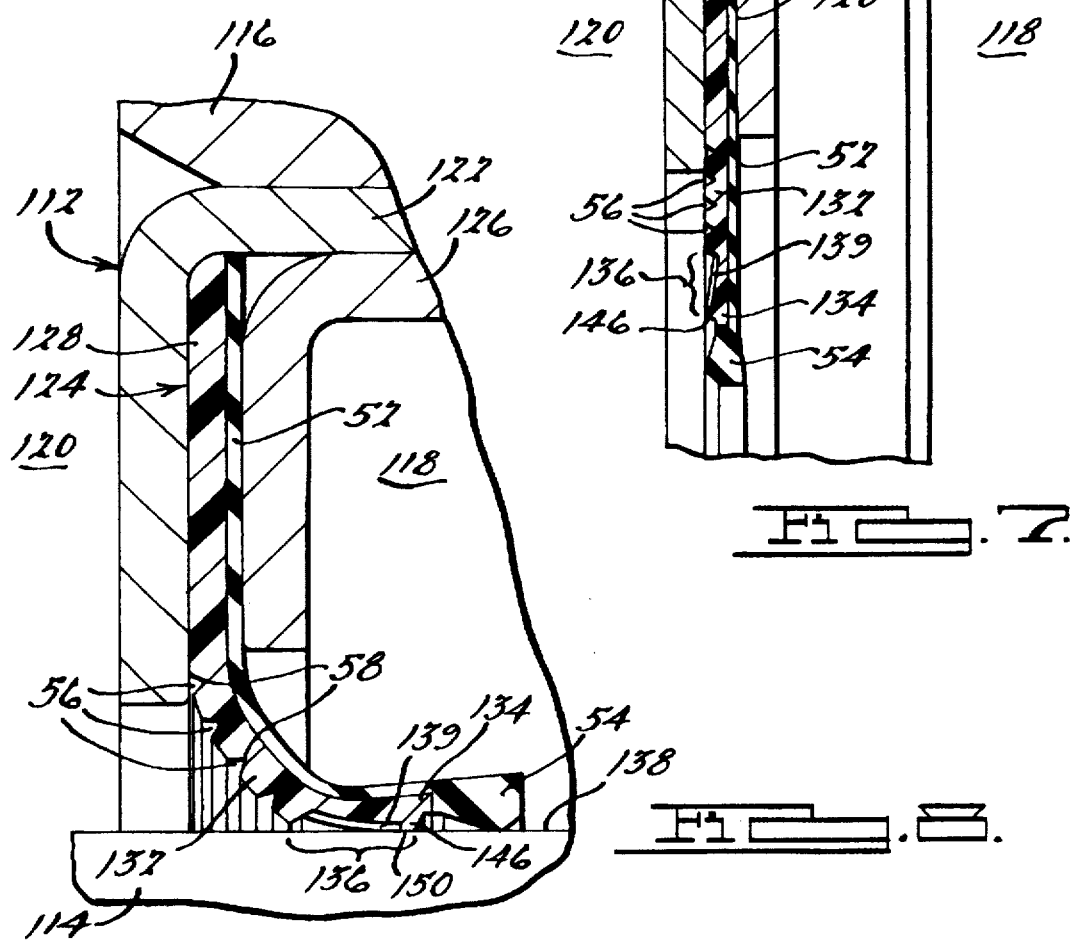

SEAL DESIGN WITH BI-DIRECTIONAL PUMPING

This is a continuation division of U.S. patent application Ser. No. 08/397,996, filed Mar. 3, 1995, now abandoned.

BACKGROUND OF THE INVENTION

1. FIELD OF THE INVENTION

The invention pertains to a fluid seal for use in sealing a rotating shaft member. More particularly, the seal performs both a static and dynamic sealing function and utilizes a plurality of radial undulations to pump back any fluid which leaks across the static seal.

2. DESCRIPTION OF THE RELATED ART

Previous shaft seals have been formed from compressive elastomeric materials for use in providing a dynamic sealing surface against a rotating shaft. Shaft seals typically seal liquid, such as a lubricating oil, from a side opened to the atmosphere. Normally such seals are used with a rotating shaft supported by a bearing or other support means. Several seals have been developed utilizing a so termed pumping action and include some type of design on the seal face; i.e., the face contacting the shaft which acts to pump the seal fluid back towards the sealed area upon rotation of the shaft. Prior art designs include ribs or groove portions orientated relative to the direction of the shaft rotation. Such orientation of the ribs or grooves results in the fluid being pumped back only when the shaft is rotating in one direction.

Additionally, seals have been previously manufactured of elastomeric or flexible materials which allow the seal to stay in contact with the shaft despite any eccentricity or lack of concentricity between the shaft and housing. However, as the seal is typically made of an elastomer having a low-wear resistance property, the life of the seal can be severely shortened. Seal wear also occurs due to the fact that the elastomeric material is compressed against the shaft surface, normally through use of a spring such as a garter spring. Such radial compression on the elastomeric material increases the wear. Several attempts have been made in the prior art to utilize a high-wear resistant material, but due to the rigidity of such high-wear resistant materials, seal formulation or design is difficult. The utilization of ribs in an elastomeric material or in a semi-rigid material is difficult as the prior art depends upon compressing the ribs in order to result in a pumping function.

SUMMARY OF THE INVENTION:

Accordingly, the present invention is a unique seal assembly having a bi-directional pumping feature for use in sealing fluids between a rotating shaft and a stationary housing wherein the rotating shaft extends through an opening in the housing. The seal establishes an oil side and an air side. In general, the seal includes a support element, such as a metal case, which is normally positioned within the housing and remains stationary. A semi-rigid seal element is secured to the support and extends radially inward to form a seal opening through which the shaft is inserted. The seal element includes a body portion, a flex portion and a seal lip wherein the seal lip includes a plurality of undulations which, when the seal is placed on the shaft, undulate radially with respect to the shaft axis. The undulations are also tapered with respect to the shaft axis or contact surface such that the taper is toward the fluid side. Additionally, the seal lip includes a continuous annular ring having an inner circumferential surface which contacts the shaft and provides a static seal.

In the preferred form, the undulations provide a dynamic sealing surface which acts to pump back any fluid which leaks across the static surface when the shaft is rotating. Additionally, the seal element is made from a rigid or semi-rigid material which provides better wear properties, thus increasing the life of the seal while maintaining the static and dynamic sealing properties of a more flexible compressive elastomeric material.

BRIEF DESCRIPTION OF THE DRAWINGS

FIG. 6 is a sectional perspective view of a first alternative embodiment of the shaft seal of FIG. 1.

FIG. 7 is a cross-sectional side view of the first alternative embodiment of FIG. 6.

FIG. 8 is a cross-sectional side view of the first alternative embodiment shown in use with a shaft.

DESCRIPTION OF THE PREFERRED EMBODIMENT(s)

Figure 1:
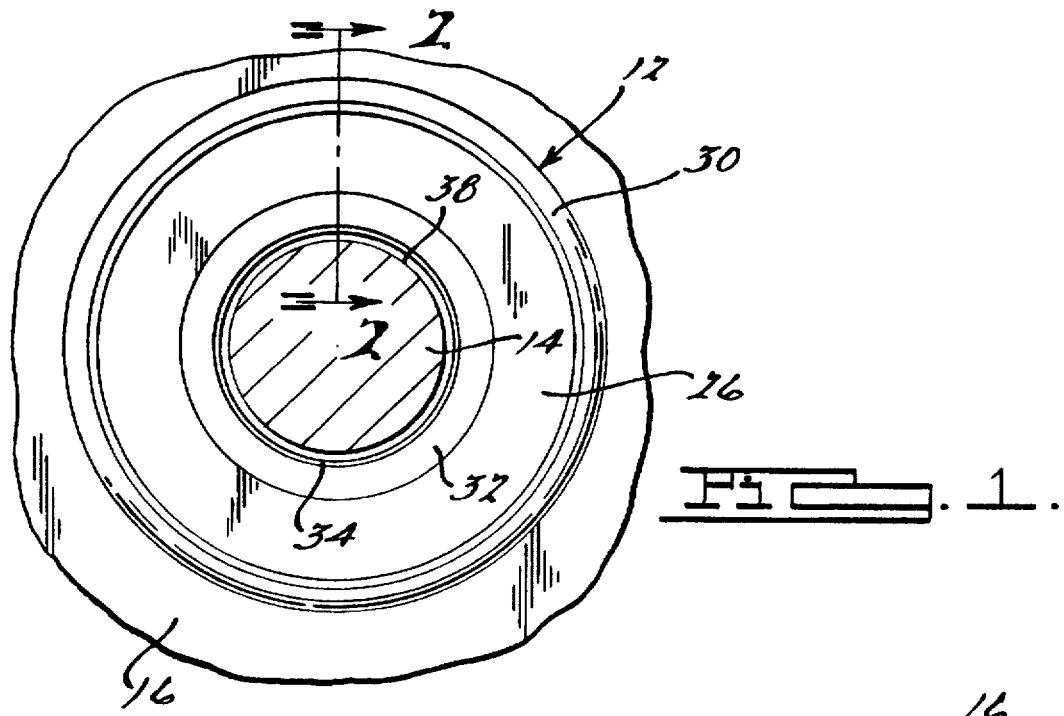
FIG. 1 is a rear view of a seal element or a shaft seal according to the present invention.
Figure 2:
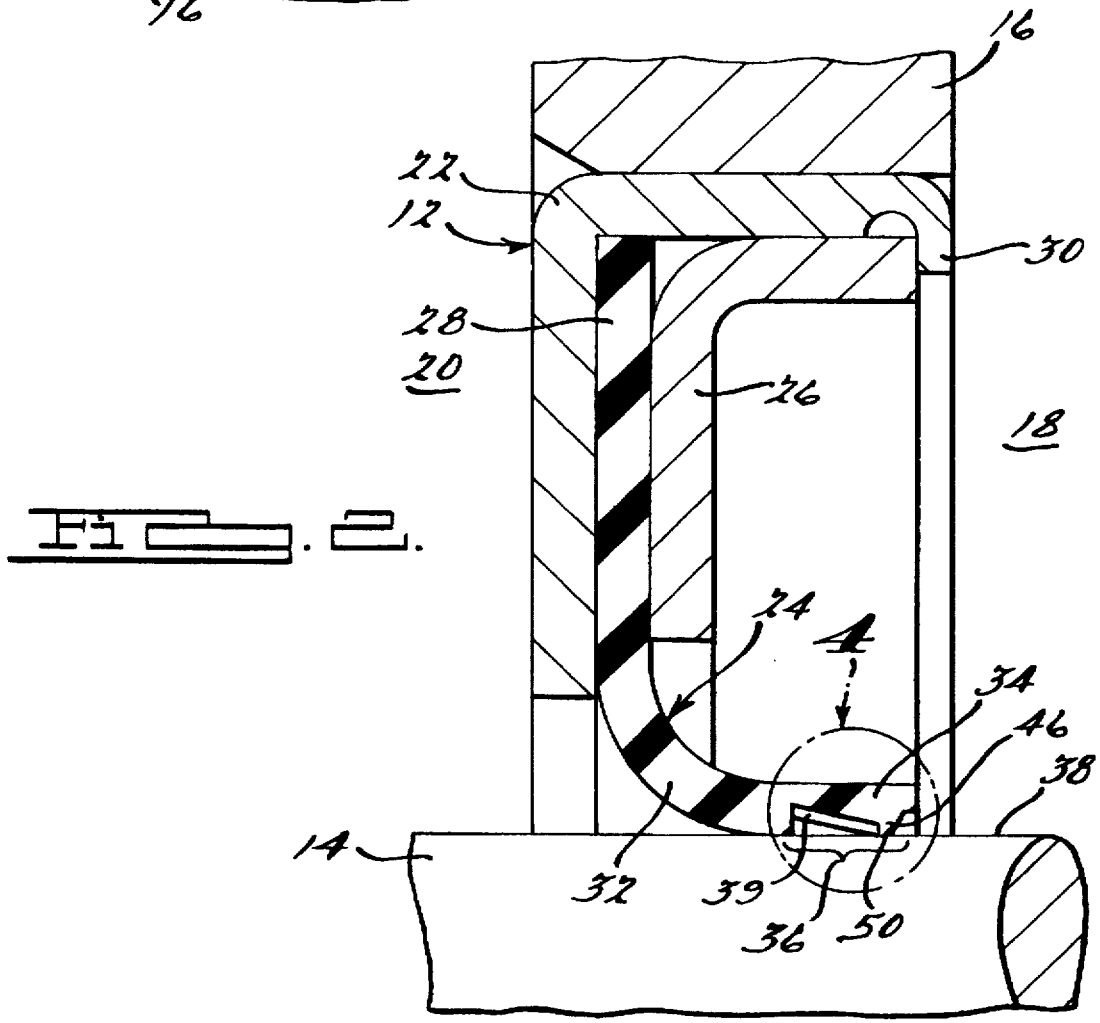
FIG. 2 is a sectional view taken along line 2—2 of FIG. 1.

Referring to the drawings, and more particularly to FIGS. 1 and 2 thereof, a shaft seal shown generally as 12 is shown for use in sealing a rotating shaft 14 within a stationary housing 16. Typically, the rotating shaft 14 is supported within the housing 16 by a set of bearings (not shown). Normally, the shaft seal 12 is used to seal a lubricating fluid, typically oil, such that it defines an oil side 18 on one side of the shaft seal 12 and an air side 20 on the opposite side of the shaft seal 12. As shown in FIG. 2, the shaft seal 12 includes a seal case 22 secured within the housing 16. A seal element 24 formed of a semi-rigid material, such as polytetrafluorethylene or any other thermoplastic or polymer material, is secured to the seal case 22 via a seal case support 26 which cooperates with the seal case 22 to sandwich a body portion 28 of the seal element 24 between them to securely mount the seal element 24. A lock flange or ring 30 is used to secure or retain the seal case support 26 in position.

Figure 3:
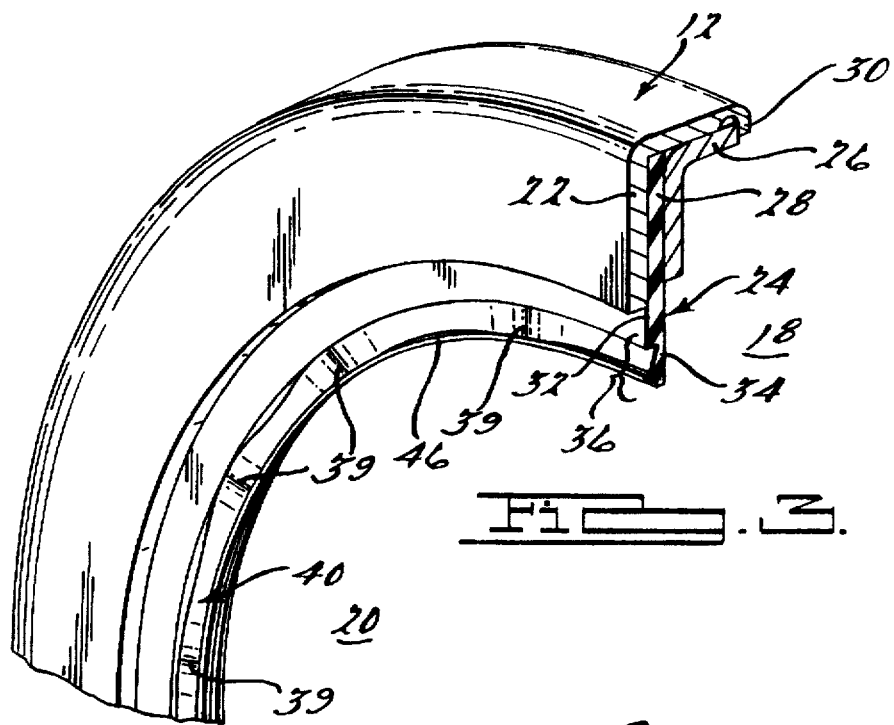
FIG. 3 is a sectional perspective view of the shaft seal of FIG. 1.

As shown in FIG. 3, the seal element 24 extends radially inward toward the shaft (not shown) in an unloaded or noninstalled position. As set forth in FIG. 2, when the shaft seal 12 or shaft 14 is installed, installation is typically accomplished by placing the shaft seal 12 in the housing 16 and then inserting the shaft 14, the shaft seal 12 bends or flexes about a flex section 32 of the seal element 24. The flex results in a seal lip 34 having a seal face 36 which contacts or is positioned adjacent the outer circumferential surface 38 of the shaft 14. Thus, the rigidity of the material of the seal element 24 causes, through the resiliency of the flex section 32, a radially compressive force to be exerted by the seal lip 34 on the outer circumferential surface 38 of the shaft.

Figure 4:
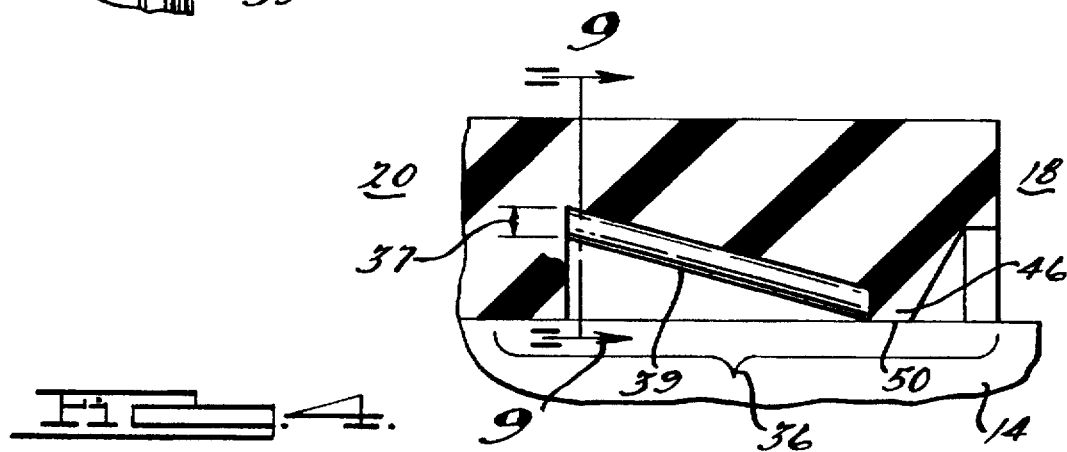
FIG. 4 is an enlarged view of a portion in circle 4 of FIG. 2.
Figure 9:
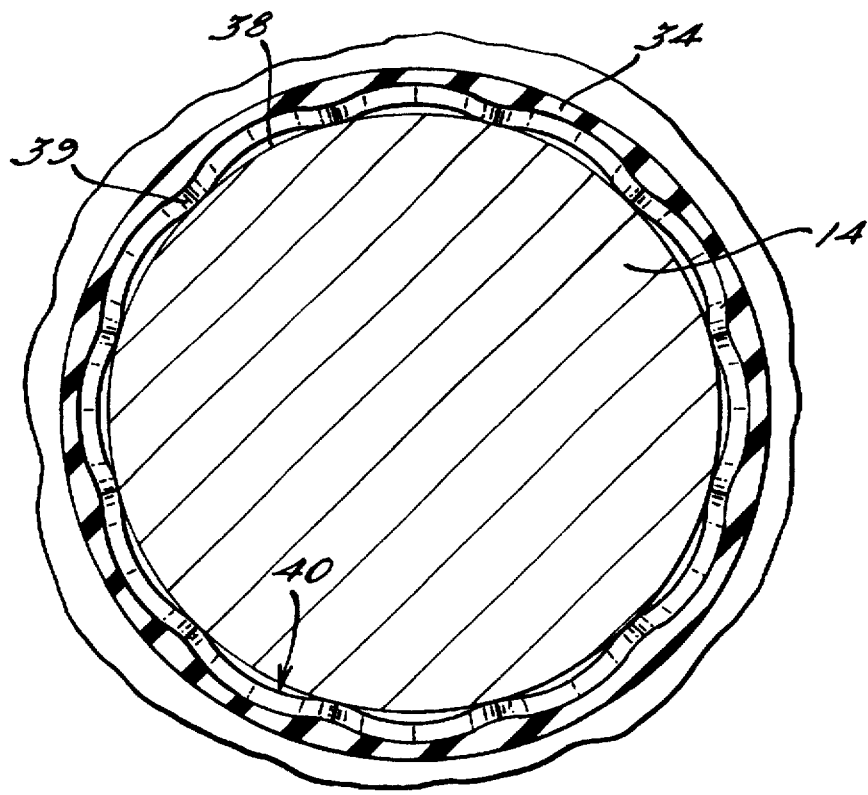
FIG. 9 is a cross-sectional side view of the embodiment of the shaft seal of FIG. 4 taken along line 9—9 of FIG. 4.

As shown in FIGS. 3, 4, and 9, the seal face 36 includes a plurality of undulations 39 forming an undulating surface 40. The undulations 39 form a recess or gap in the seal face 36 As shown, the undulations 39 are sinusoidal and extend along the entire seal face 36 and provide a dynamic seal during rotation of the shaft 14. The undulations have an apex and a nadir has been inserted after the undulations 39 provide a forwarding or pumping action toward the oil side 18 of the shaft seal 12. As shown in FIG. 4, the stroke or displacement 37 of the undulations 39 is between 0.05 millimeters and 1.0 millimeters depending upon the fluid material to be sealed. The undulations 39 are based on linear displacement; i.e., they are consistent and along the entire width of the undulation and have a consistent rise and fall rate. Undulations of the type set forth herein are further shown in U.S. Pat. No. 5,190,299, the disclosure of which is hereby incorporated by reference.

Figure 5:
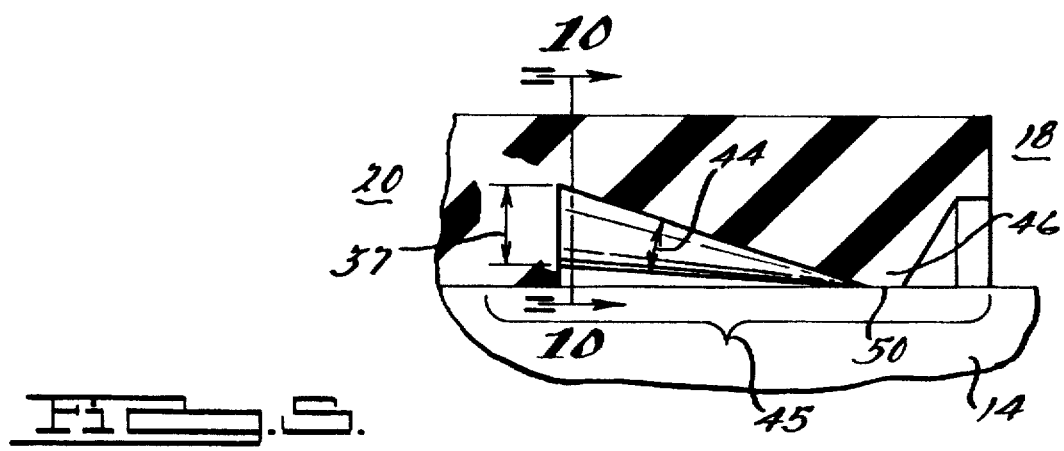
FIG. 5 is an enlarged view of an alternative embodiment of the shaft seal in circle 4 of FIG. 3.
Figure 10:
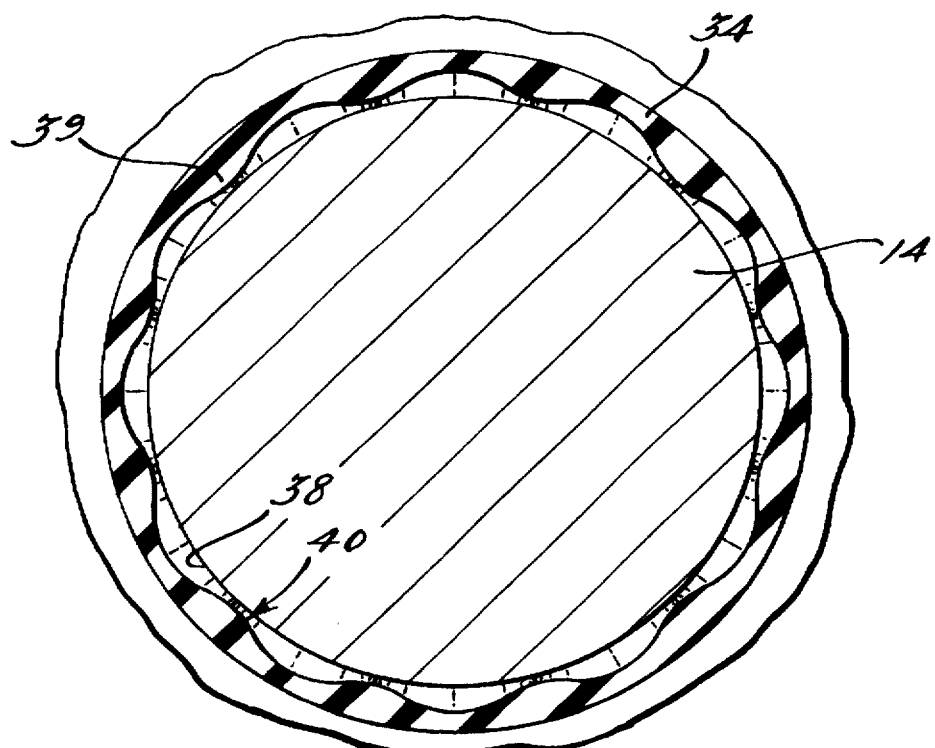
FIG. 10 is a cross-sectional side view of the alternative embodiment of the shaft seal taken along line 10—10 of FIG. 5.

FIGS. 5 and 10 illustrate a first alternative embodiment wherein the undulating surface is produced by a variation in the angle of undulation 44. Such angular variation undulations also provide a radially undulating shaft seal face 45 which results in the generation of a forwarding or pumping action toward the oil side 18. The angle of undulation 44 normally faces away from the oil side 18 at an angle of 2 to 20 degrees with respect to the longitudinal axis of the shaft 14. It will be seen that the overall height 37 of each undulation 39 will vary depending upon the angle 44 selected.

The seal lip further includes a continuous annular band 46 which engages the outer circumferential surface 38 of the shaft 14. The continuous annular band 46 forms a static sealing surface which is adjacent with the oil side 18 of the shaft seal 12. The force exerted by the flex section 32 keeps the annular band 46 in contact with the outer circumferential surface 38 of the shaft to provide a static seal when the shaft 14 is in a stationary or nonrotating position. As the shaft 14 begins to turn, liquid from the oil side 18 attempts to work its way through a gap created between the static seal; i.e., annular band 46, and the outer circumferential surface 38 of the shaft 14. However, any liquid migrating along the joint or interface 50 will be pumped back across by the dynamic sealing portion comprised of the undulating surface 40.

As shown in FIG. 9, the undulations 39 forming the undulating surface 40 are symmetrical, thus the seal acts to pump fluid regardless of the direction of rotation of the shaft 14. Such a seal is especially useful with reversible-type motors; i.e., those which operate in an environment which requires the shaft to routinely operate in both a forward and reverse direction of rotation.

Referring now to FIGS. 6–8, a shaft seal 112, according to an alternative embodiment of the shaft seal 12 of the present invention, is shown. Like parts of the shaft seal 112 have like reference numerals increased by 100. The shaft seal 112 is formed of a seal case 122 and seal case support 126 having a seal element 124 sandwiched therebetween. The seal element 124 includes a thin elastomer layer 52. The elastomeric layer 52 is added to the seal element 124 on the side adjacent the oil side 118 or sealed space. The elastomeric layer includes an additional static seal lip 54. The extra elastomeric sealing lip 54 provides an additional sealing surface for use with thin or low viscosity fluids.

The seal element 124 further includes a plurality of circumferential grooves 56 located in the flex section 132. The circumferential grooves 56 reduce the radial force exerted upon the seal face 136 causing the seal face 136 to contact the shaft 114. Further, the circumferential grooves 56 result in even bending of the flex section 132 to increase flexibility. Should any of the circumferential grooves 56 happen to crack at an apex 58 of the circumferential groove, the elastomeric layer 52 seals the seal element 124 and the seal element 124 remains functional with no static leak path.

While only certain embodiments of the present invention have been described, it will be apparent that the present invention, in light of the disclosure set forth above, that various changes and modifications may be made without departing from the spirit and the scope of the present invention.

What is claimed is:

1. A shaft seal for use in sealing fluids or for preventing migration of fluids along a rotating shaft positioned within a stationary housing having an opening through which the shaft extends, said shaft seal comprising:

a seal case;

a semi-rigid element connected to said case, said seal element including a body portion, a flex section and a seal lip, said seal lip having a seal face, said seal face having a gap, said gap forming a recess in said seal lip, said recess including a plurality of radial undulations, said undulations tapered with respect to the outer circumferential surface of the shaft such that the taper is toward the fluid side; and a static seal formed when said shaft is stationary on said seal face, said static seal formed of a continuous annular ring, said ring having an inner circumferential surface which contacts an outer circumferential surface of the shaft.

2. A shaft seal as set forth in claim 1 wherein said flex section includes a circumferential groove, said groove reducing the radial force with which the seal element grips the shaft.

3. A shaft seal as set forth in claim 1 including a layer of elastomer connected to said seal element, said elastomer positioned between a fluid side and said seal element.

4. A shaft seal as set forth in claim 3 wherein said elastomer further includes a static seal lip, said seal lip engaging said shaft to provide an additional static seal when the shaft is stationary.

5. A shaft seal as set forth in claim 2 wherein said circumferential groove is substantially V-shaped.

6. A shaft seal as set forth in claim 1 wherein said seal element is formed of a fluorinated resin.

7. A shaft seal as set forth in claim 1 wherein said seal element is formed of a thermo-plastic elastomer.

8. A shaft seal as set forth in claim 1 wherein said undulations have a sinusoidal shape.

9. A shaft seal as set forth in claim 1 wherein said undulations are symmetrical such that each undulation is tapered with a similar rise and fall rate.

10. A shaft seal for use in preventing migration of a fluid along a rotating shaft rotatably mounted within a stationary housing, said shaft seal comprising:

a seal case;

a seal element connected to said seal case, said seal element including a body portion, a flex section and a seal lip, said seal lip having a seal face, said seal face having a gap, said gap forming a recess in said seal lip, said recess including a plurality of symmetrical radial undulations;

said undulations tapering toward a fluid side of said seal assembly wherein said seal lip includes a continuous annular ring forming a static seal when the shaft is stationary, said ring having an inner circumferential surface which contacts an outer circumferential surface of said shaft, said seal flex section including a plurality of circumferential grooves for reducing the radial force with which the seal element grips the shaft.

11. A shaft seal as set forth in claim 10 wherein said seal element is made from a fluorinated resin.

12. A shaft seal as set forth in claim 10 wherein said seal is made of a thermo-plastic elastomer.

13. A shaft seal as set forth in claim 10 wherein said symmetrical undulations have a sinusoidal shape.

14. A shaft seal for use with a rotating shaft extending through a stationary housing, said shaft preventing the migration of fluids from a liquid side to an air side said shaft seal comprising:

a seal case, said seat case secured to said housing;

a semi-rigid seal element, said seal element including a body portion, a flex section and a seal lip;

said seal element connected to said seal case at said body portion, said seal lip including a seal face for engaging an outer circumferential surface of said shaft, said seal face having a gap, said gap forming a recess in said seal lip, said recess including a plurality of undulations, said undulations tapering towards the liquid side when said seal face is in contact with said outer circumferential surface of said shaft;

a continuous annular ring formed on said seal lip, said ring having an inner circumferential surface which contacts the outer circumferential surface of the shaft; and an elastomeric member attached to said seal element on said liquid side, said elastomeric element further including a static seal lip which is formed when the shaft is stationary, said static seal lip engaging the outer circumferential surface of the shaft.

15. A shaft seal as set forth in claim 14 wherein said flex section includes a plurality of circumferential grooves, said grooves reducing the radial force with which the seal face contacts the shaft.

16. A shaft seal as set forth in claim 15 wherein said seal element is formed of a fluorinated resin material.

17. A shaft seal as set forth in claim 15 wherein said seal element is formed of a thermo-plastic elastomer.

18. A shaft seal as set forth in claim 15 wherein said undulations have a sinusoidal shape and said undulations are symmetrical with respect to the rise and fall rate of said undulations.

19. A radial shaft seal having a central seal axis and a lip that surrounds a rotating shaft to be sealed, the shaft having a longitudinal axis, the shaft seal having a first side that defines a fluid side and an opposite side, the radial shaft seal comprising:

a seal face having a plurality of radial undulations, said undulations tapered with respect to an outer circumferential surface of the shaft such that the taper is toward the fluid side, said undulations having an apex and a nadir, the height between said apex and said nadir defining a stroke; and a static seal in spaced relation to said seal face, said static seal formed of a continuous circular annular ring, said ring having an inner circumferential surface which contacts the outer circumferential surface of the shaft.

20. A radial shaft seal according to claim 19 wherein one of said undulations merges with said static seal, said undulations forming an angle of undulation with its origin at said inner circumferential surface of said static seal, said angle of undulation varies with the height of said stroke.

21. A radial shaft seal according to claim 20 wherein said angle of undulation faces away from the fluid side at an angle between 2 to 20 degrees with respect to the longitudinal axis of the shaft.

22. A radial shaft seal according to claim 19 further comprising:

an elastomeric layer adjacent to said fluid side, said elastomeric layer having a second continuous static seal lip in spaced relationship to said static seal.

23. A radial seal according to claim 19 wherein the height of said stroke is between 0.05 mm to 1.0 mm.

24. A radial shaft seal according to claim 19 wherein the height of said undulations varies with said angle of undulation.

25. A radial shaft seal according to claim 19 wherein said seal face having portions defining a passage, said undulations formed in said passage.

26. A radial shaft seal comprising:

a seal face having portions defining a passage, said passage having a plurality of radial undulations formed in said passage; and a static seal which merges into said seal face, said static seal formed of a continuous circular annular ring, said ring having an inner circumferential surface, said undulations forming an angle of undulation with its origin at said inner circumferential surface, the height of said undulations vary with said angle of undulation.

27. A radial shaft seal which is contiguous with a rotating shaft the rotating shaft having a longitudinal axis, said shaft seal having a first side that defines a fluid side and an opposite side, said shaft seal further having a polymeric sealing lip for preventing the migration of fluid along the rotating shaft, said radial shaft seal comprising:

a seal face having a plurality of radial sinusoidal undulations, said undulations having an apex and a nadir, the height between said apex and said nadir defining a stroke, said stroke tapered with respect to an outer circumferential surface of the shaft such that the taper is toward the fluid side, said undulations having an angle of undulation which faces away from the fluid side at an angle between 2 to 20 degrees with respect to the longitudinal axis of the shaft; and a static seal in spaced relation to said seal face, said static seal formed of a continuous circular annular ring, said ring having an inner circumferential surface which contacts the outer circumferential surface of the shaft.

28. A radial shaft seal according to claim 27 wherein said undulations further having an angle of undulation which varies with the height of said stroke and a static seal which merges into said seal face.

* * * * *